(12) United States Patent
Seo

(10) Patent No.: US 6,701,991 B2
(45) Date of Patent: Mar. 9, 2004

(54) HOT AIR WELDER FOR A SYNTHETIC RESIN

(76) Inventor: Gi Won Seo, 201-401, Hyundai yeonyein Apt., 685-70 Gurol-dong, Guro-gu, Seoul (KR)

( * ) Notice: Subject to any disclaimer, the term of this patent is extended or adjusted under 35 U.S.C. 154(b) by 0 days.

(21) Appl. No.: 10/236,101

(22) Filed: Sep. 5, 2002

(65) Prior Publication Data

US 2003/0070766 A1 Apr. 17, 2003

(30) Foreign Application Priority Data

Oct. 11, 2001 (KR) .................................. 10-2001-0062699

(51) Int. Cl.⁷ .............................................. B29C 65/10
(52) U.S. Cl. ........................ 156/497; 156/82; 156/499; 156/555
(58) Field of Search ...................... 156/82, 497, 499, 156/544, 555, 574, 580, 582

(56) References Cited

U.S. PATENT DOCUMENTS 5,091,038 A    2/1992  Greller et al. .............. 156/443
6,053,230 A    4/2000  Pelland ....................... 156/359
6,129,809 A  * 10/2000  Ellenberger et al. ........ 156/351
6,213,184 B1   4/2001  Sinclair ....................... 156/499
6,471,803 B1 * 10/2002  Pelland et al. ................ 156/64

* cited by examiner

Primary Examiner—James Sells

(57) ABSTRACT

Disclosed is a hot air welder that consecutively joins sheets of synthetic resin material together to make a large-sized pavilion or a tent fabric, or welds and seals the seam lines of waterproof textiles or the like for waterproofing process. Instead of the conventional table-shaped body, there are provided an upright-standing drive body; hot-air welding means on an upper-side of the drive body; upper and lower drive rollers under the welding means, and wherein the welding work is performed by rotating and using alternatively the upper drive roller or the lower drive roller, according to the kind of fabrics to be welded and the work-substances. Therefore the heat welding and waterproofing process may be performed more easily for more various shaped work-substances, and that the troublesome work-substances such as sleeve or shoulder parts of waterproof clothes that have various positioned and shaped seam lines may be moved and rotated easily by the worker to be heat-welded and become waterproofed.

3 Claims, 9 Drawing Sheets

HOT AIR WELDER FOR A SYNTHETIC RESIN

BACKGROUND OF THE INVENTION

1. Field of the Invention

The present invention relates to a hot air welder that consecutively joins sheets of synthetic resin material together to make a large-sized pavilion or a tent fabric, or welds and seals the seam lines of waterproof textiles or the like for waterproofing process, and particularly to a hot air welder that operates upper and lower drive rollers having different fixed-positions and shapes according to the patterns and sizes or shapes of fabrics to be welded with hot air, and selects drive rollers in a suitable state for the work fabric, thereby making the welding process easier, greatly reducing the defective ratio of the welding process and increasing the productivity.

2. Description of the Related Art

As shown in FIG. 6, a conventional hot air welder includes upper and lower rollers on a table-shaped body 100, and a separately-provided hot air generator 101 between the upper and lower rollers. When overlapped sheets of synthetic resin and a film supplied from a weld film portion 102 are introduced between the upper and lower rollers, the hot air generator 101 discharges a hot air thereto, so that the overlapped synthetic resin sheets are heat-welded by high temperature heat in combination with the compression operation of the upper and lower rollers.

Besides the welding process, the hot air welder is also used in a waterproofing process for seam lines of waterproof products, where a separately provided waterproof film is heat-welded for the seam lines of the waterproof products, thereby ensuring their complete waterproof protection.

Thus-welded sheet fabrics are used in a case where it is impossible to make a large-sized sheet fabric at a time, like the pavilion or a large-sized tent fabric. In addition, for clothes requiring the waterproof protection, like a raincoat or special working clothes, the synthetic resin film is heat-weld for the seam line of its fabric, thereby manufacturing waterproof fabrics having much improved waterproof ability.

However, in the above-mentioned conventional hot air welder, because the welding means is disposed on the table-shaped body, the table-shaped body serves as a barrier to the work and causes troubles in securing the workspace, making the work difficult. In addition, in a case of performing a waterproofing process for clothes such as waterproof clothes, it is very difficult or impossible to perform the waterproofing process for the seams of sleeve or shoulder parts.

Further, when various welding angles or positions are needed along the seam lines, as in the waterproofing work for the waterproof clothes having various to-be-welded parts, the conventional hot air welder cannot meet the requirement, failing to perform the waterproofing work for the seam lines, because the drive roller for conveying the introduced sheet is fastened on the table-shaped body.

SUMMARY OF THE INVENTION

Therefore, it is an object of the present invention to overcome the above-mentioned problems of the prior art, and the object is achieved by providing a hot air welder for synthetic resin wherein, instead of the conventional table-shaped body, there are provided an upright-standing drive body; hot-air welding means on an upper-side of the drive body; upper and lower drive rollers under the welding means, and wherein the welding work is performed by rotating and using alternatively the upper drive roller or the lower drive roller, according to the kind of fabrics to be welded and the work-substances, so that the heat welding and waterproofing process may be performed more easily for more various shaped work-substances, and that the troublesome work-substances such as sleeve or shoulder parts of waterproof clothes that have various positioned and shaped seam lines may be moved and rotated easily by the worker to be heat-welded and become waterproofed.

DETAILED DESCRIPTION OF THE EMBODIMENTS

Figure 1:
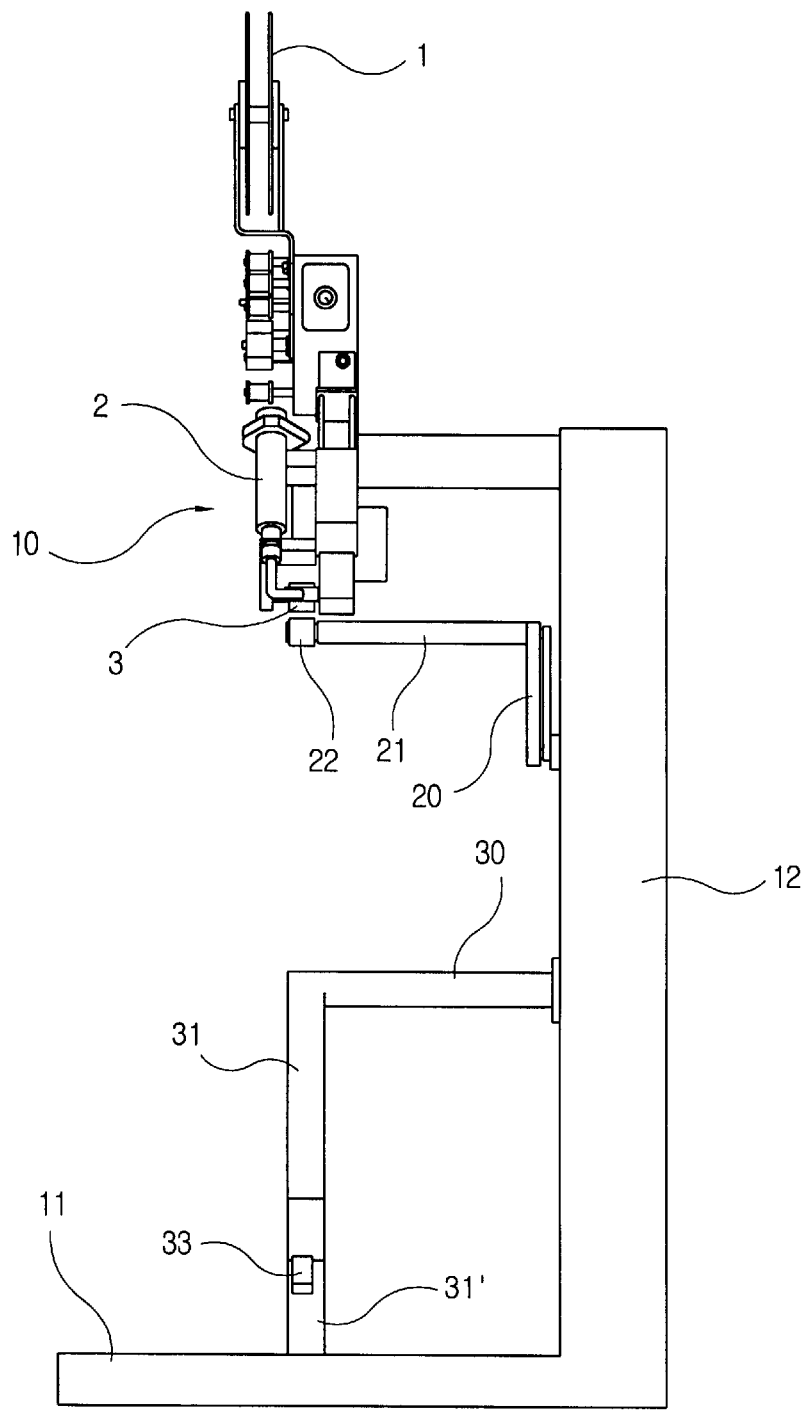
FIG. 1 is an entire view showing a hot air welder according to the present invention.

Hereinafter, preferred embodiments of the present invention will be described in more detail referring to the drawings.

Figure 2:
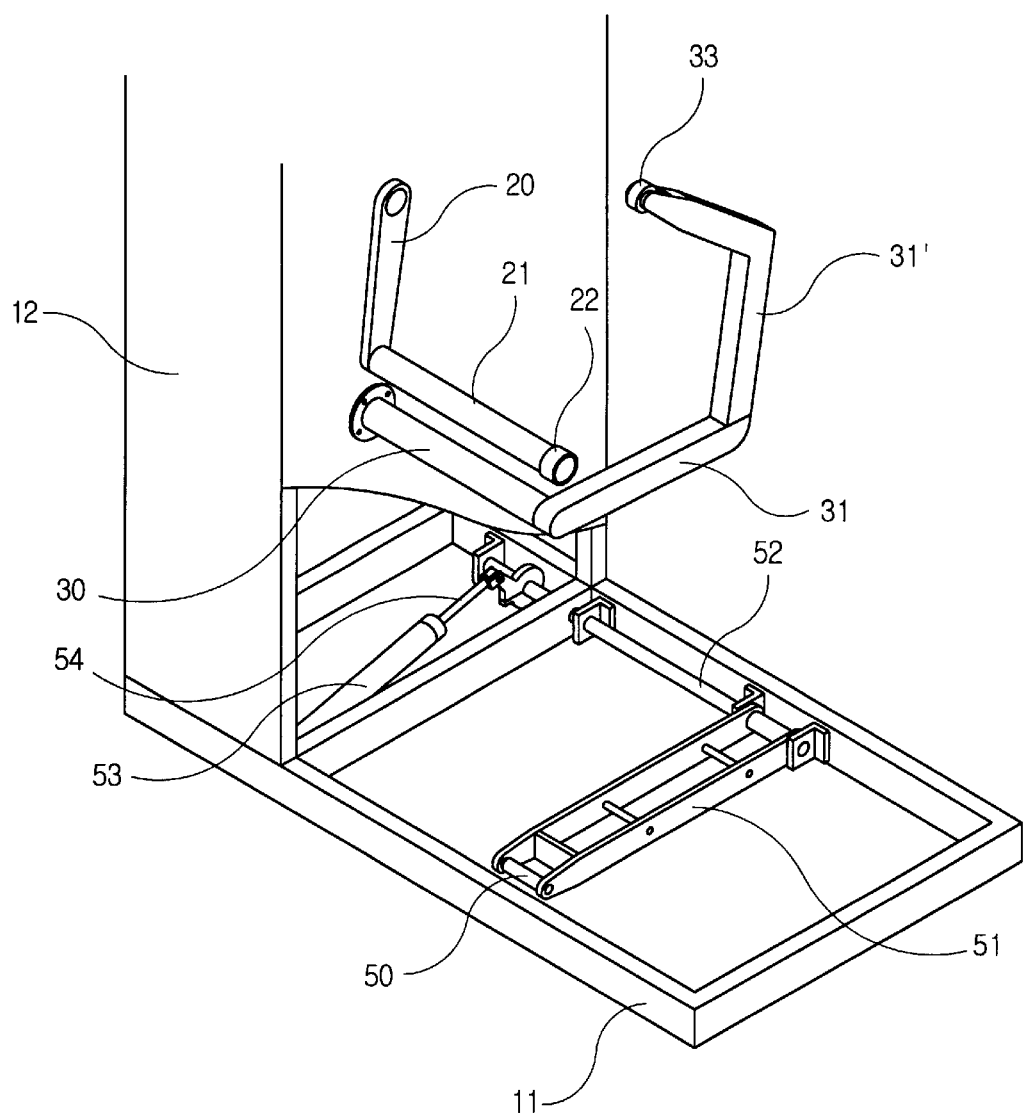
FIG. 2 is a perspective view showing the main part of the hot air welder according to the present invention.

FIG. 1 is an entire view of a hot air welder according to the present invention, and FIG. 2 is a detailed perspective view of the main part of the hot air welder.

As shown in the figures, the hot air welder includes welding means 10 that comprises a waterproof film supply roller 1, a hot air generator 2 and an upper roller 3.

An upright case-shaped drive body 12 is provided on one end of a support base 11.

The welding means 10 is disposed on an upper end of the drive body 12. Under the welding means 10, there is provided an upper drive roller 22 for circumferential-directed welding process that is rotated by a connecting belt 29 included in a connecting rod 21 and a support arm 20.

Under the upper drive roller 22, there is provided a lower drive roller 33 for longitudinal-directed welding process that is rotated by connecting belts 32 and 32' included in a plurality of bent arms 31 and 31' and a connecting rod 30.

Figure 4A:
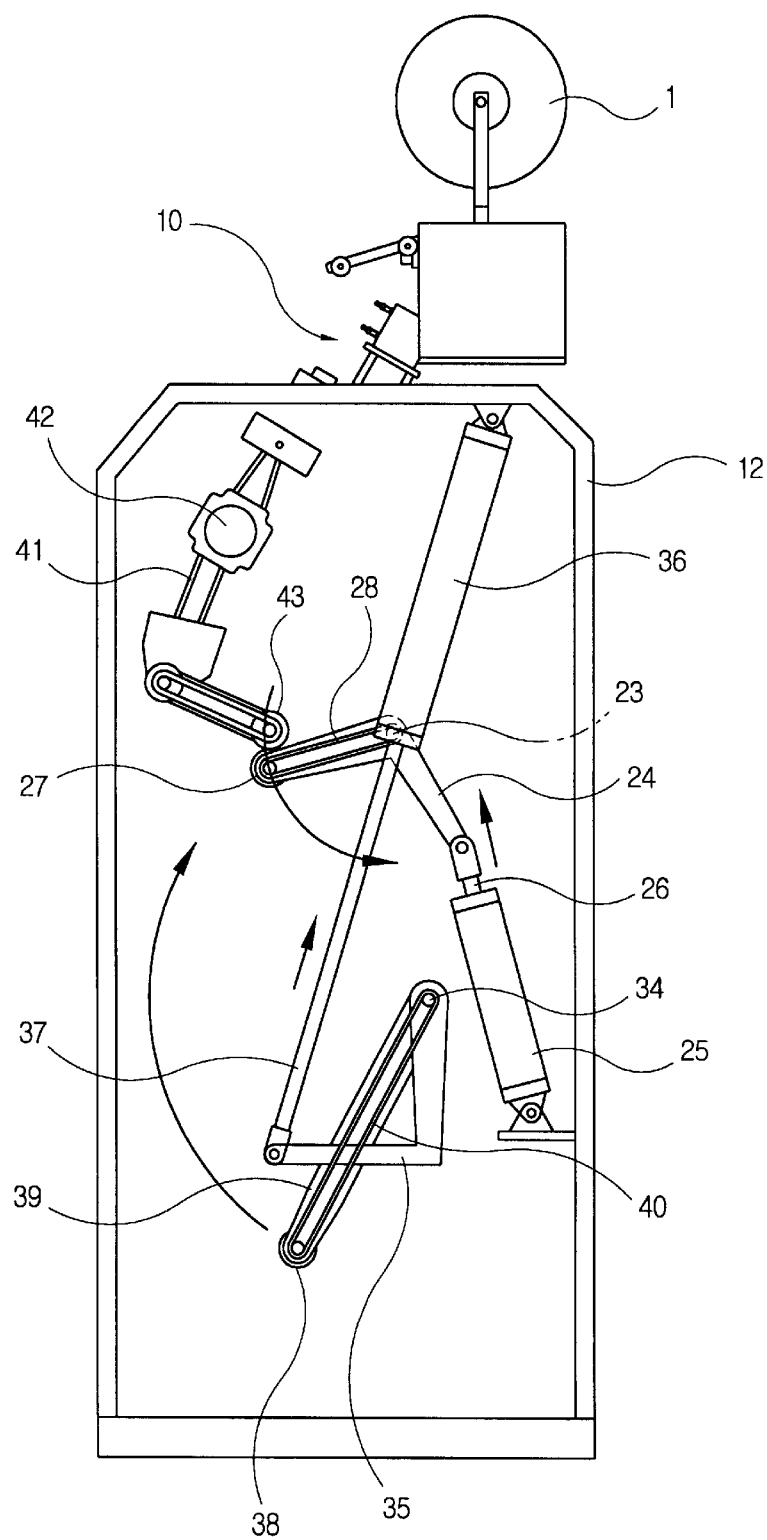
FIGS. 4a and 4b are rear views of the drive portion of the hot air welder according to the present invention, and each shows its drive state when the upper and lower drive rollers are loaded, respectively.
Figure 4B:
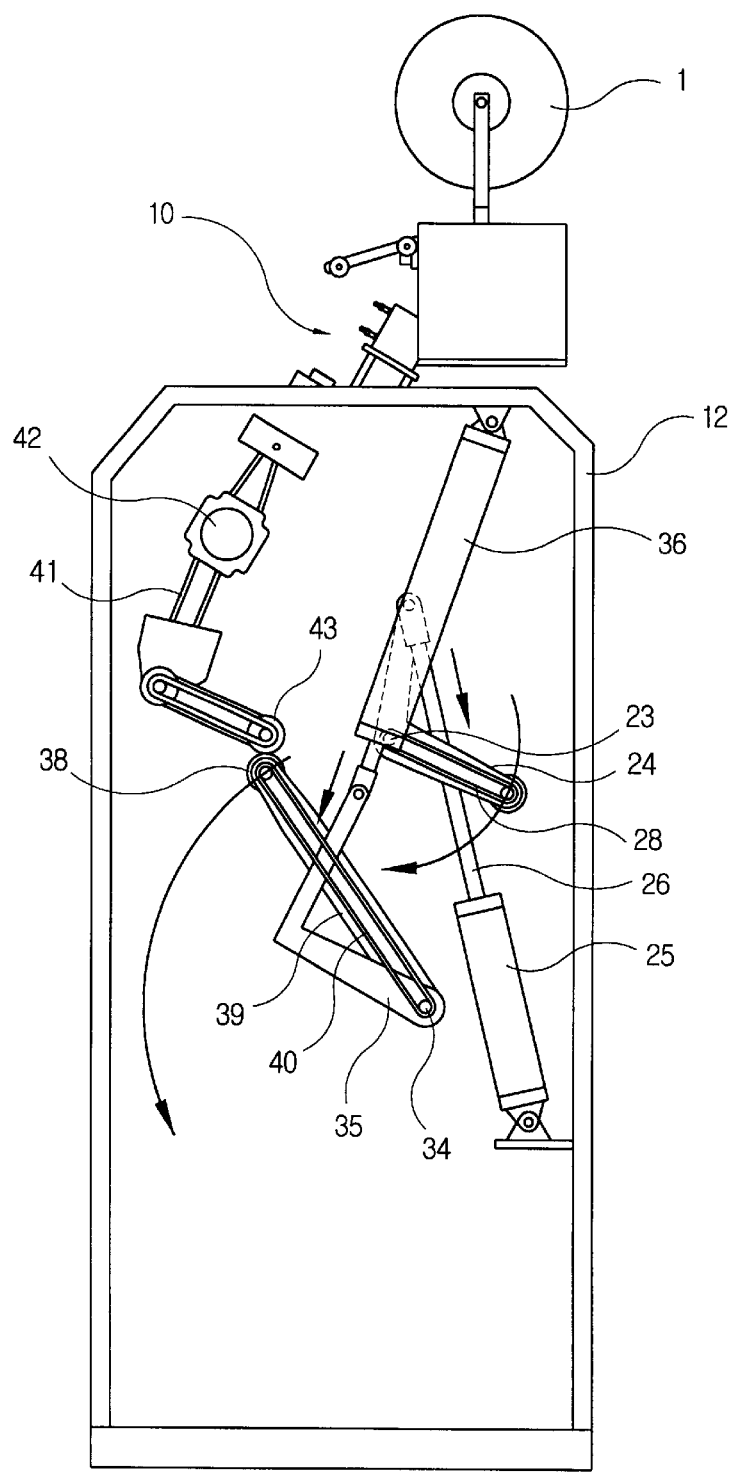

As shown in FIGS. 4a and 4b, the support arm 20 is connected to a rotation lever 24 provided on a rotation shaft 23 included in the drive body 12; one end of the rotation lever 24 is connected to a cylinder shaft 26 of a cylinder 25 rotatably fixed to the drive body 12; a gear 27 is provided on the other end of the rotation lever 24; and the rotation shaft 23 is connected to the gear 27 through a chain 28.

The connecting rod 30 is connected to a bent lever 35 whose one end is connected to a rotation shaft 34 included in the drive body 12; the other end of the bent lever 35 is connected to a cylinder shaft 37 of a cylinder 36 rotatably fixed to the drive body 12; a connecting plate 39 having a gear 38 is coupled to the rotation shaft 34; and the rotation shaft 34 is connected to the gear 38 through a chain 40.

A motor 42 for rotating a chain 41 and a gear 43 formed on one end of the chain 41 are disposed on the internal upper portion of the drive body 12. The gear 43 is engaged with both the gear 38 of the bent lever 35 and the gear 27 of the rotation lever 24, respectively, as shown in FIGS. 4a and 4b.

In addition, as shown in FIG. 2, a pedestal 51 including a support roller 50 on one end thereof is rotatably disposed on one internal side of the support base 11. One end of a rotation shaft 52 is pivotly connected to a fixed end of the pedestal 51, and the other end is connected to a cylinder shaft 54 of a cylinder 53 fixed to one side of the support base 11, so that the pedestal 51 can be rotated by the piston movement of the cylinder shaft 54.

A more detailed description will now be made of the operation of the hot air welder according to the present invention, referring to the attached drawings.

The hot air welder for synthetic resin selects alternatively the upper drive roller 22 or the lower drive roller 33 to be brought into contact with the upper roller 3 disposed on the welding means, based on the shape of the fabric subject to the welding or waterproofing process.

Figure 3A:
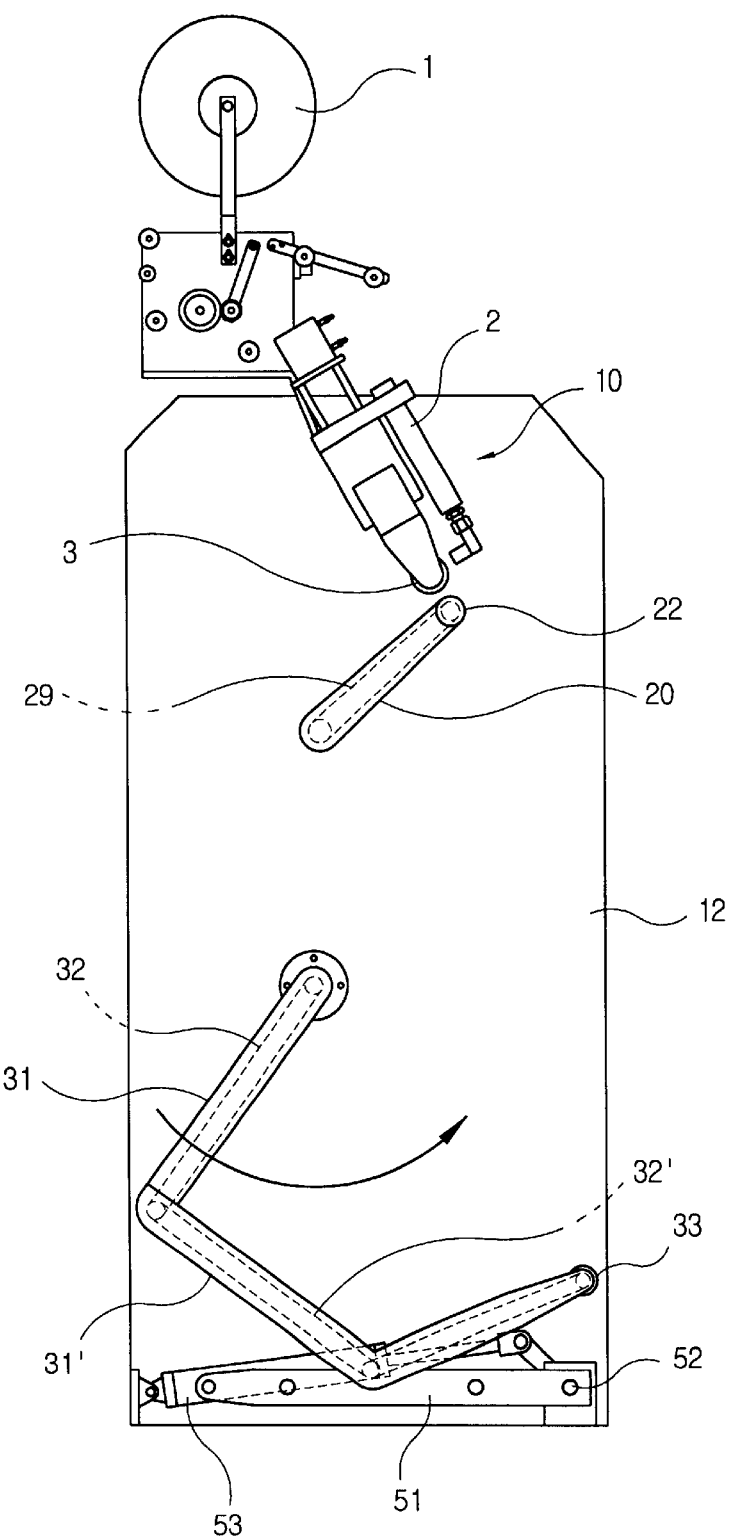
FIGS. 3a and 3b are front views of the hot air welder according to the present invention when upper and lower drive rollers are moved upward, respectively.

As shown in FIG. 3a, in a state where the upper drive roller 22 has been rotated upward to be in contact with the upper roller 3 of the welding means 10, the upper roller 3 and the upper drive roller 22 press together and weld a not-shown fabric introduced from the upstream side.

In this case, together with the fabric, a not-shown waterproof film supplied from the waterproof film supply roller 1 above the welding means 10 is introduced between the upper roller 3 and the upper drive roller 22, thereby welding the seam of the fabric, or separated and overlapped fabrics.

Figure 3B:
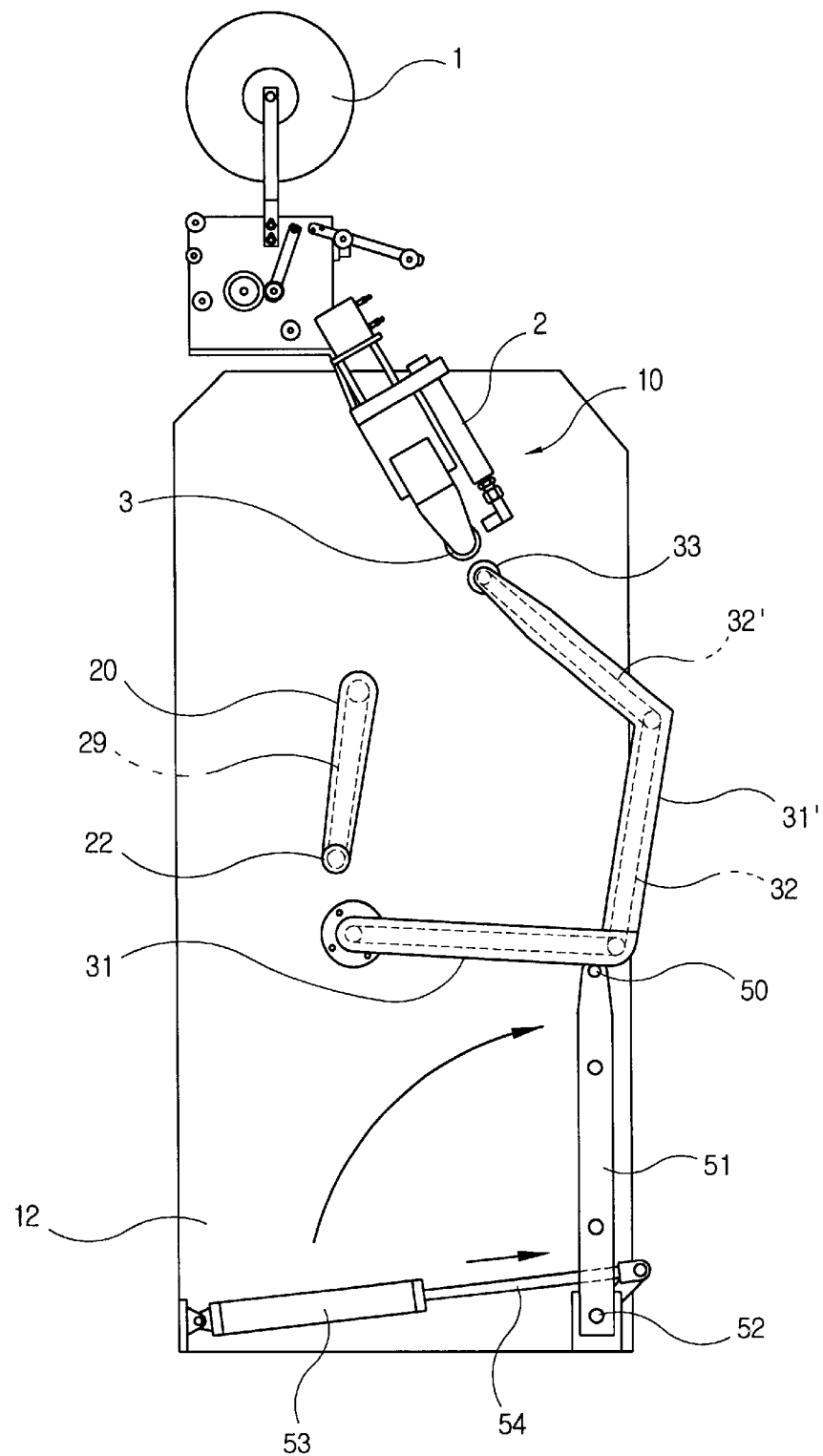

In addition, in a state as shown in FIG. 3b where, with the upper drive roller 22 being rotated downward, the lower drive roller 33 has been rotated upward to be in contact with the upper roller 3 of the welding means 10, the upper roller 3 and the lower drive roller 33 perform various welding and waterproofing processes as described above referring to FIG. 3a.

Such rotation movements of the upper and lower drive rollers 22 and 33 are made by a plurality of cylinders included in the drive body 12.

In more detail, the rotation lever 24 coupled to the support arm 20 of the upper drive roller 22 of FIG. 2 is rotated, as shown in FIG. 4a, by the piston movement of the cylinder shaft 26 of the cylinder 25 that is coupled to the drive body 12, thereby rotating the upper drive roller 22.

As shown in FIG. 4a, when the cylinder shaft 26 is fully inserted in the cylinder 25, the rotation lever 24 is in clockwise-rotated position, and the gear 27 coupled to one end of the rotation lever 24 is engaged with the gear 43 whose rotation is made by the motor 42 and the chain 41. That is, when the support arm 20 is brought into the clockwise-rotated slate by the operation of the cylinder 25, the gear 27 is engaged with the gear 43, and, in addition, the chain 28 is rotated to rotate the central rotation shaft 23 of the rotation lever 24. When the central rotation shaft 23 is rotated by the chain 28, the upper drive roller 22 is rotated by the connecting belt 29 included in the support arm 20.

Thus, being introduced between the upper drive roller 22 and the upper roller 3 of the welding means 10, the fabric and the waterproof film are pressed and heat-welded by the hot air supplied from the hot air generator 2.

In addition, the selection of the kind of the drive roller is determined according to the characteristics of the fabric and the waterproof product. When the lower drive roller 33 is selected, as shown in FIG. 4b, the support arm 20 is rotated to move the upper drive roller 22 down, and the connecting rod 30 is rotated to move the lower drive roller 33 up.

In more detail, in a case where there is a need to use the lower drive roller 33, the cylinder shaft 26 is extracted from the cylinder 25, so that the rotation lever 24 fixed to one end of the cylinder shaft 26 rotates in counterclockwise direction. Thereby, the gear 27 disposed on the rotation lever 24 is separated from the gear 43 that is rotated by the motor 42.

In addition, in a state where the upper drive roller 22 is completely moved down by the rotation of the rotation lever 24 to a predetermined rotation angle, when the cylinder 37 is inserted into the cylinder 36, rotating the bent lever 35 in clockwise direction, the bent arms 31 and 31' and the connecting rod 30 connected to the bent lever 35 as shown in FIG. 3b are all rotated, moving the lower drive roller 33 up. Thereby, the gear 38 disposed on the one end of the connecting plate 39 provided separately from the bent lever 35 becomes engaged with the gear 43 of the motor 42, transferring the drive power to the lower drive roller 33.

That is, the chain 41 is rotated by the rotation of the motor 42, thereby rotating the gear 43, and the gear 38 of the connecting plate 39 is rotated in combination with the rotation of the gear 43. Thereby, the rotation shaft 34 connected to the connecting belts 32 and 32' included in the bent arms 31 and 31' is rotated by the chain of the connecting plate 39 connected to the gear 38, consequently rotating the lower drive roller 33.

Thus, with the fabric and the waterproof product being introduced, their welding and waterproofing processes are performed and, at the same time, the fabric moves on by the rotation movement of the lower drive roller 33, thereby achieving the automatic work.

The upper and lower drive rollers 22 and 33 handle different kinds of the introduced waterproof product and fabric, according to their handling positions.

Figure 5A:
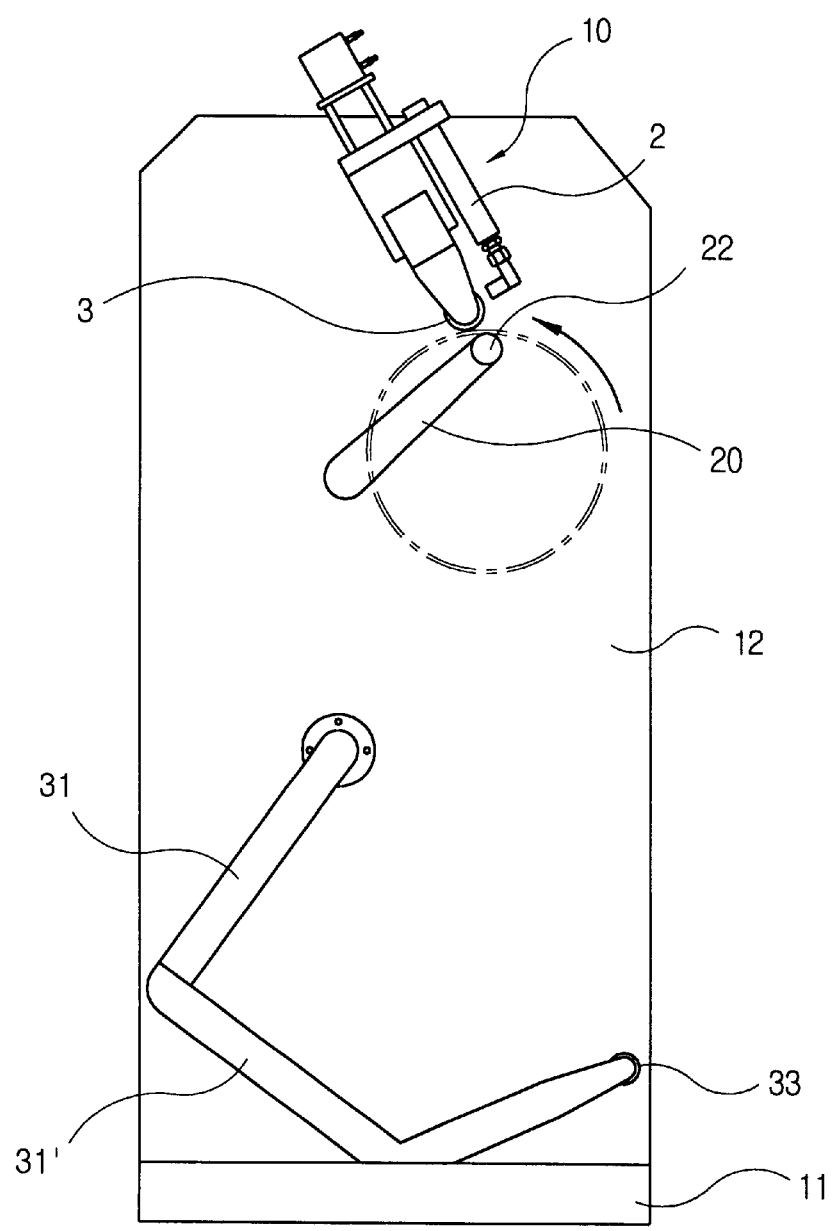
FIGS. 5a and 5b show examples of the welding work when using the upper and lower drive rollers, respectively.

When the welding and waterproofing processes are performed for a ring-shaped one as shown in FIG. 5a, that is, in a case where there is a need to perform the welding process in the circumferential direction, like the sleeve part of the waterproof product, the upper drive roller 22 for circumferential-directed welding process, attached to the end of the protruded connecting rod 21, is moved up thereby making it possible to perform the welding process more easily.

Figure 5B:
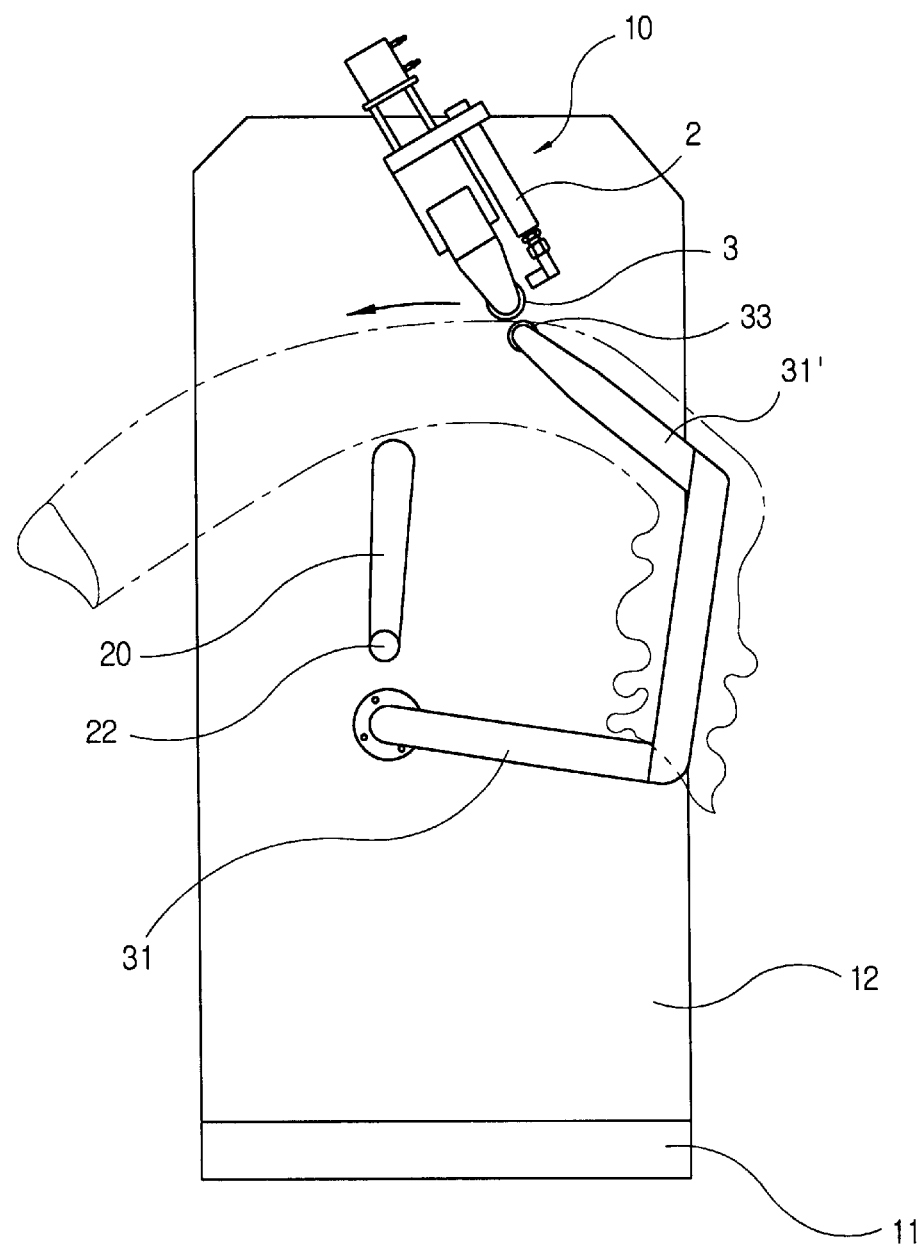
Figure 6:
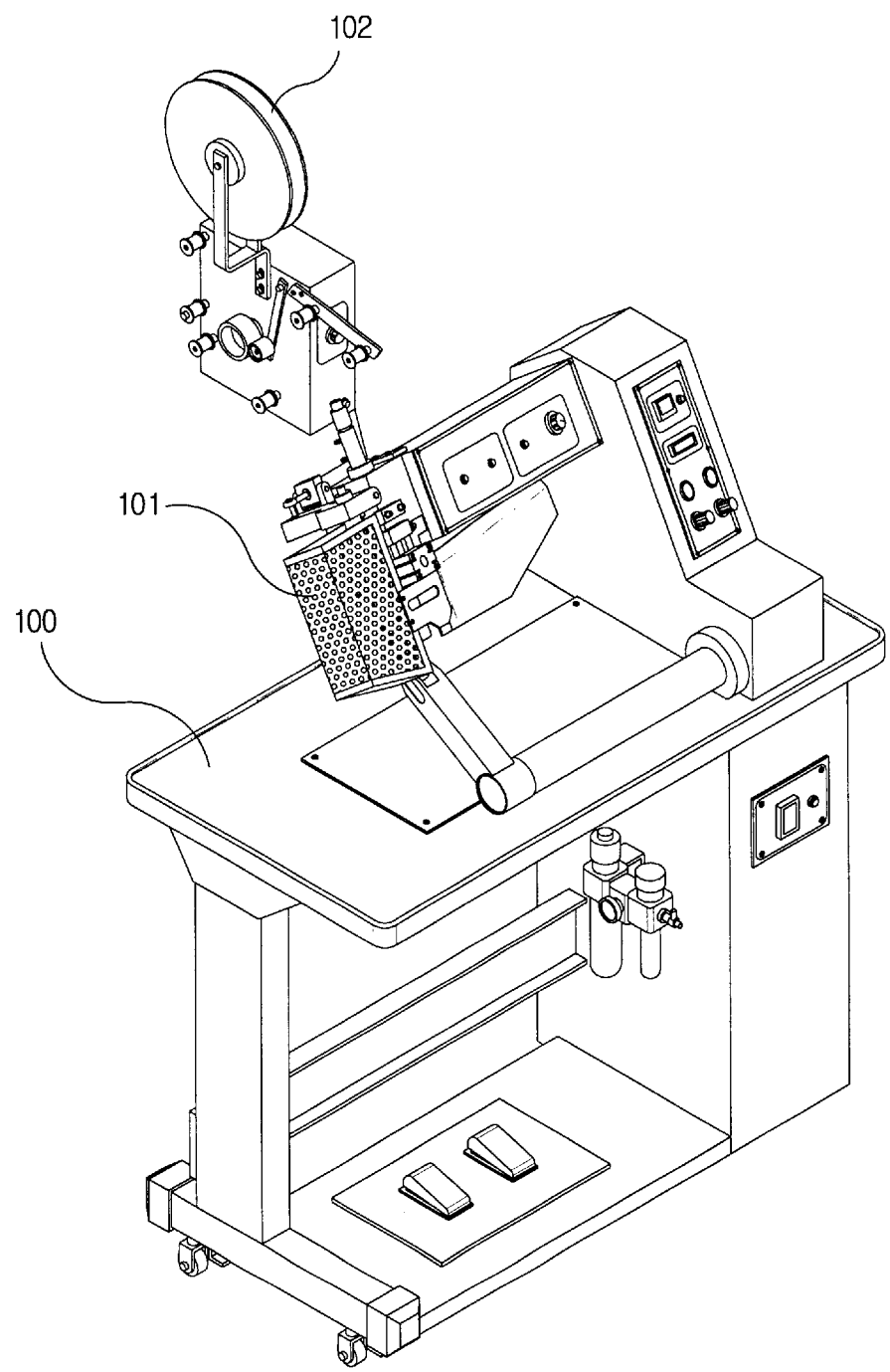
FIG. 6 is an entire perspective view showing the conventional hot air welder.

When the welding and waterproofing processes are performed in the longitudinal direction for tube-shaped clothes and fabric as shown in FIG. 5b, the lower drive roller 33 for longitudinal-directed welding process is moved up, making it possible to perform the work continuously in the longitudinal direction.

This method is very advantageous in the waterproofing process for the shoulder or arm parts of waterproof clothes.

Meanwhile, because the lower drive roller 33 is supported by a plurality of bent arms 31 and 31' differently from the upper drive roller 22, drooping of the lower drive roller 33 is caused by its own weight. For this reason, simultaneously with the upward movement of the lower drive roller 33, the cylinder shaft 54 disposed in the lower part of the drive body 12 is extracted from the cylinder 53, rotating the rotation shaft 52 fixed to the end of the cylinder shaft 54. This rotation of the rotation shaft 52 allows the pedestal 51 fixed to the other end of the cylinder shaft 54 to be stood upright.

The upright-standing pedestal 51 permits the bent arm 31 of the lower drive roller 33 to be put on the upper portion of the support roller 50 attached to one end of the pedestal 51. Therefore, the bent arms 31 and 31' including the lower drive roller 33 are supported by the upright-standing pedestal 51. This allows securing more stable position of the lower drive roller 33 and also avoiding the position change or the falling of the lower drive roller 33 during the work that are caused by both the pressure of the worker and the weight of the fabric.

The above-mentioned hot air welder for synthetic resin according to the present invention has advantages that the heat welding and waterproofing process may be performed more easily for more various shaped work-substances, and that the troublesome work-substances such as sleeve or shoulder parts of waterproof clothes that have various positioned and shaped seam lines may be moved and rotated easily by the worker to be heat-welded and become waterproofed.

Although preferred embodiments of the present invention have been described, it is to be understood that the invention is not limited thereto and that various changes and modifications may be made without departing from the spirit and scope of the invention.

What is claimed is:

1. A hot air roller for synthetic resin including welding means (10), the welding means (10) including a waterproof film supply roller (1), a hot air generator (2), an upper roller (3), a lower roller being rotated by drive means, and a pedestal (51), wherein the lower roller includes an upper drive roller (22) for circumferential-directed welding process and a lower drive roller (33) for longitudinal-directed welding process, and the upper and lower drive rollers (22) and (33) are disposed on a side of a drive body (12) having a support base (11) so that the upper drive roller (22) or the lower drive roller (33) is rotated to be alternatively brought into contact with the upper roller (3);

the upper drive roller (22) is rotatably disposed on an end of a connecting rod (21), the connecting rod (21) being coupled to an end of a support arm (20), the support arm (20) being rotatably coupled to the drive body (12);

the lower drive roller (33) is rotatably disposed on an end of a bent arm (31) and (31'), the bent arm (31) and (31') being coupled to an end of a connecting rod (30), the connecting rod (30) being rotatably coupled to the drive body (12); and the pedestal (51) includes a support roller (50) on one end thereof, and another end of the pedestal (51) is disposed on an internal side of the support base (11) and coupled to a first rotation shaft (52) connected to a first cylinder shaft (54) of a first cylinder (53), the first cylinder being coupled to a side of the support base (11), so that a piston movement of the first cylinder shaft (54) allows the pedestal (51) to rotate to become in position of supporting the bent arm (31) of the lower drive roller (33).

2. The hot air roller according to claim 1, wherein the support arm (20) is connected to a rotation lever (24) included in the drive body (12); one end of the rotation lever (24) is coupled to an end of a second cylinder shaft (26) of a second cylinder (25), the second cylinder (25) being rotatably coupled to the drive body (12); another end of the rotation lever (24) includes a first gear (27); and the first gear (27) is connected to a second rotation shaft (23) for rotating the upper drive roller (22) through a first chain (28), and wherein the first gear (27) of the rotation lever (24) is engaged with a second gear (43), the second gear (43) receiving a drive power, through a second chain (41), from a motor (42) included in the drive body (12), so that the upper drive roller (22) is rotated by the first chain (28) and a connecting belt (29), and wherein the rotation lever (24) is rotated by a piston movement of the second cylinder shaft (26), thereby rotating the support arm (20).

3. The hot air roller according to claim 1, wherein the connecting rod (30) is connected to one end of a bent lever (35) included in the drive body (12), and another end of the bent lever (35) is connected to an end of a second cylinder shaft (37) of a second cylinder 36 rotatably coupled to the drive body (12), and wherein there is further provided a connecting plate (39) for operating in connection with the bent lever (35), the connecting plate (39) including a first gear (38) on its one end, and the gear (38) is connected to a second rotation shaft (34) for rotating the lower drive roller (33) through a first chain (40), and wherein the first gear (38) of the bent lever (24) is engaged with a second gear (43), the second gear (43) receiving a drive power, through a second chain (41), from a motor (42) included in the drive body (12), so that the lower drive roller (33) is rotated by the first chain (28) and a connecting belt (32) and (32'), and wherein the bent lever (35) and the connecting rod (30) are rotated together by a piston movement of the second cylinder shaft (37).

* * * * *